(12) United States Patent
Bassali et al.

(10) Patent No.: US 8,707,182 B2
(45) Date of Patent: Apr. 22, 2014

(54) METHODS AND SYSTEMS FOR DYNAMICALLY INSERTING AN ADVERTISEMENT INTO A PLAYBACK OF A RECORDED MEDIA CONTENT INSTANCE

(75) Inventors: Harpal S. Bassali, San Francisco, CA (US); Marcelo D. Lechner, Burlington, MA (US); Michael P. Ruffini, Methuen, MA (US); Armando P. Stettner, Westford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 597 days.

(21) Appl. No.: 12/690,544

(22) Filed: Jan. 20, 2010

(65) Prior Publication Data

US 2011/0179356 A1 Jul. 21, 2011

(51) Int. Cl.
G06F 3/00 (2006.01)
G06F 3/01 (2006.01)

(52) U.S. Cl.
USPC .......... 715/723; 715/716; 715/717; 715/718; 715/719; 715/720; 715/721; 715/722; 715/724; 715/725; 715/726

(58) Field of Classification Search
USPC .......................................... 715/704, 716–726
See application file for complete search history.

(56) References Cited

U.S. PATENT DOCUMENTS

| | | | |
|---|---|---|---|
| 6,177,931 B1 * | 1/2001 | Alexander et al. | 725/52 |
| 6,351,736 B1 * | 2/2002 | Weisberg et al. | 705/14.46 |
| 6,463,468 B1 * | 10/2002 | Buch et al. | 709/219 |
| 6,684,249 B1 * | 1/2004 | Frerichs et al. | 709/225 |
| 6,698,020 B1 * | 2/2004 | Zigmond et al. | 725/34 |
| 6,772,129 B2 * | 8/2004 | Alvarez et al. | 705/14.41 |
| 6,950,623 B2 * | 9/2005 | Brown et al. | 455/3.01 |
| 7,292,773 B2 * | 11/2007 | Angel | 386/248 |
| 7,565,429 B1 * | 7/2009 | Fernandez | 709/224 |
| 7,613,691 B2 * | 11/2009 | Finch | 1/1 |
| 7,650,617 B2 * | 1/2010 | Hoshino et al. | 725/34 |
| 7,698,236 B2 * | 4/2010 | Cox et al. | 706/12 |
| 7,711,791 B2 * | 5/2010 | DuVall et al. | 709/217 |
| 7,725,464 B2 * | 5/2010 | Grubb et al. | 707/723 |
| 7,779,437 B2 * | 8/2010 | Barton | 725/32 |
| 7,805,373 B1 * | 9/2010 | Issa et al. | 705/51 |
| 7,860,996 B2 * | 12/2010 | Musayev et al. | 709/231 |
| 7,925,774 B2 * | 4/2011 | Zhang et al. | 709/231 |
| 7,986,868 B2 * | 7/2011 | Barton et al. | 386/291 |
| 8,036,514 B2 * | 10/2011 | Barton et al. | 386/248 |
| 8,051,443 B2 * | 11/2011 | Candelore et al. | 725/32 |
| 8,060,407 B1 * | 11/2011 | Delker et al. | 705/14.68 |
| 8,069,262 B2 * | 11/2011 | Liu | 709/231 |
| 8,079,045 B2 * | 12/2011 | Krapf et al. | 725/34 |
| 8,079,052 B2 * | 12/2011 | Chen et al. | 725/88 |
| 8,132,203 B2 * | 3/2012 | de Heer | 725/34 |
| 8,151,294 B2 * | 4/2012 | Carlucci et al. | 725/32 |

(Continued)

Primary Examiner — Steven B Teriault

(57) ABSTRACT

An exemplary method includes maintaining data representative of a recorded media content instance comprising a media content program and a first advertisement and an index file corresponding to the recorded media content instance, playing back the recorded media content instance in accordance with timestamp data and storage location data included in the index file, dynamically replacing, during the playback of the recorded media content instance, a portion of the storage location data in the index file that corresponds to the first advertisement with storage location data corresponding to a second advertisement, and presenting the second advertisement in place of the first advertisement during the playback of the recorded media content instance in accordance with the modified index file. Corresponding methods and systems are also described.

22 Claims, 11 Drawing Sheets

(56) References Cited

U.S. PATENT DOCUMENTS

| | | | |
|---|---|---|---|
| 8,155,498 B2* | 4/2012 | Dow et al. | 386/221 |
| 8,176,512 B2* | 5/2012 | Barton | 725/34 |
| 8,214,273 B2* | 7/2012 | Dharmaji et al. | 705/35 |
| 8,270,810 B2* | 9/2012 | Karaoguz et al. | 386/248 |
| 2002/0083445 A1* | 6/2002 | Flickinger et al. | 725/35 |
| 2002/0087402 A1* | 7/2002 | Zustak et al. | 705/14 |
| 2002/0144262 A1* | 10/2002 | Plotnick et al. | 725/32 |
| 2002/0169540 A1* | 11/2002 | Engstrom | 701/200 |
| 2003/0055995 A1* | 3/2003 | Ala-Honkola | 709/231 |
| 2003/0135853 A1* | 7/2003 | Goldman et al. | 725/34 |
| 2004/0103429 A1* | 5/2004 | Carlucci et al. | 725/32 |
| 2004/0268398 A1* | 12/2004 | Fano et al. | 725/88 |
| 2005/0278747 A1* | 12/2005 | Barton et al. | 725/58 |
| 2006/0080167 A1* | 4/2006 | Chen et al. | 705/14 |
| 2006/0168630 A1* | 7/2006 | Davies | 725/89 |
| 2006/0253330 A1* | 11/2006 | Maggio et al. | 705/14 |
| 2006/0265657 A1* | 11/2006 | Gilley | 715/730 |
| 2007/0005795 A1* | 1/2007 | Gonzalez | 709/232 |
| 2007/0083886 A1* | 4/2007 | Kauffman et al. | 725/34 |
| 2007/0204310 A1* | 8/2007 | Hua et al. | 725/88 |
| 2008/0040740 A1 | 2/2008 | Plotnick et al. | |
| 2009/0199236 A1* | 8/2009 | Barrett et al. | 725/36 |
| 2009/0210899 A1 | 8/2009 | Lawrence-Apfelbaum et al. | |
| 2009/0222851 A1 | 9/2009 | Talmi | |
| 2010/0054707 A1* | 3/2010 | Karaoguz et al. | 386/95 |
| 2010/0080529 A1* | 4/2010 | Barton et al. | 386/68 |
| 2010/0146542 A1* | 6/2010 | Weihs et al. | 725/34 |
| 2010/0153988 A1* | 6/2010 | Takai et al. | 725/32 |
| 2010/0172625 A1* | 7/2010 | Lee et al. | 386/68 |
| 2010/0218208 A1* | 8/2010 | Holden | 725/32 |
| 2010/0275228 A1* | 10/2010 | Panje | 725/38 |
| 2010/0293058 A1* | 11/2010 | Maher et al. | 705/14.66 |
| 2010/0333132 A1* | 12/2010 | Robertson et al. | 725/32 |
| 2011/0035382 A1* | 2/2011 | Bauer et al. | 707/741 |
| 2011/0145857 A1* | 6/2011 | Agarwal et al. | 725/32 |
| 2012/0114301 A1* | 5/2012 | Barton et al. | 386/241 |

* cited by examiner

METHODS AND SYSTEMS FOR DYNAMICALLY INSERTING AN ADVERTISEMENT INTO A PLAYBACK OF A RECORDED MEDIA CONTENT INSTANCE

BACKGROUND INFORMATION

Set-top box devices and other media content access devices are often configured to provide users with access to a large number and variety of media content choices. For example, a user may choose to experience a variety of broadcast television programs, pay-per-view services, video-on-demand programming, Internet services, and audio programming via a set-top box device.

Many media content access devices include a digital video recording ("DVR") application that allows a user to record and then view or otherwise experience recorded media content in one or more "trick play" modes. For example, a user may play back a presentation of a media content instance, skip to a different position within a media content instance, fast forward within a media content instance, and/or rewind within a media content instance.

Each time a user views a recorded media content instance (e.g., a television program), the same advertisements that were originally included in the media content instance when the media content instance was recorded are again presented to the user. With time, these advertisements become outdated. Moreover, the user is more apt to skip over the advertisements if he or she has already seen them. Therefore, it would be desirable to be able to dynamically replace one or more of the advertisements included in a recorded media content instance with one or more new advertisements each time the user views the recorded media content instance.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
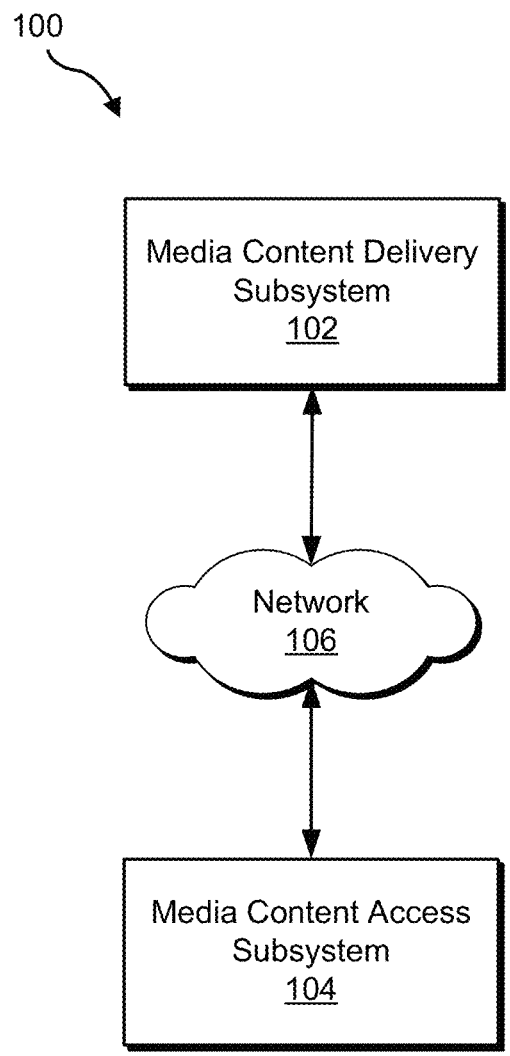
FIG. 1 illustrates an exemplary media content delivery system according to principles described herein.

Exemplary methods and systems for dynamically inserting an advertisement during playback of a recorded media content instance are described herein. As described in more detail below, a media content access subsystem (e.g., a set-top box device) may maintain data representative of a recorded media content instance and an index file corresponding to the recorded media content instance. The recorded media content instance may include a media content program and a first advertisement, which may be embedded within the media content program at any suitable temporal location. The index file may include timestamp data and storage location data corresponding to the media content program and to the first advertisement.

In some examples, the media content access subsystem may play back the recorded media content instance in accordance with the timestamp data and storage location data included in the index file. The playback may be performed linearly (e.g., "normal" playback) and/or non-linearly (e.g., using a trick play mode). The media content access subsystem may dynamically replace, during the playback of the recorded media content instance, a portion of the storage location data in the index file that corresponds to the first advertisement with storage location data corresponding to a second advertisement. The dynamic replacement results in a modified index file, which may be used by the media content access subsystem to present the second advertisement in place of the first advertisement during the playback of the recorded media content instance.

As used herein, the term "media content" may refer generally to any content made accessible by a media content delivery subsystem to an access subsystem. The term "media content instance" as used herein may refer generally to any television program, on-demand media program, pay-per-view media program, broadcast media program (e.g., broadcast television program), multicast media program, narrowcast media program, IPTV content, advertisement (e.g., commercial), video, movie, song, or any segment, component, or combination of these or other forms of media content that may be viewed or otherwise experienced by a user. A "recorded media content instance" refers to a media content instance that has been recorded or otherwise stored by a media content access subsystem.

As will be described in more detail below, the methods and systems described herein facilitate real-time insertion of advertisements during playback of a recorded media content instance. In this manner, new advertisements (e.g., advertisements that target or are otherwise deemed relevant to a user of a media content access device) may be presented to the user each time the user views the recorded media content instance. By inserting the advertisements in real-time during playback of the recorded media content instance, the media content access subsystem may ascertain which user is viewing the playback and tailor the inserted advertisement to that user. Moreover, the methods and systems described herein may ensure seamless transitions between the media content program included in the recorded media content instance and the dynamically inserted advertisements, regardless of the type of playback being performed by the media content access subsystem.

FIG. 1 illustrates an exemplary media content delivery system 100 (or simply "system 100"). System 100 may include a media content delivery subsystem 102 (or simply "delivery subsystem 102") and a media content access subsystem 104 (or simply "access subsystem 104") in communication with one another via a network 106. Access subsystem 104 may be configured to communicate with and receive one or more media content instances and/or advertisements from delivery subsystem 102.

Delivery subsystem 102 and access subsystem 104 may communicate using any suitable communication technologies, devices, networks, media, and protocols supportive of remote data communications. For example, delivery subsystem 102 and access subsystem 104 may communicate over network 106 using any communication platforms and technologies suitable for transporting media content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Network 106 may include one or more networks or types of networks (and communication links thereto) capable of carrying communications, media content, and/or data signals between delivery subsystem 102 and access subsystem 104. For example, network 106 may include, but is not limited to, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying data and/or communications signals between delivery subsystem 102 and access subsystem 104. Communications between delivery subsystem 102 and access subsystem 104 may be transported using any one of above-listed networks, or any combination or sub-combination of the above-listed networks.

Figure 2:
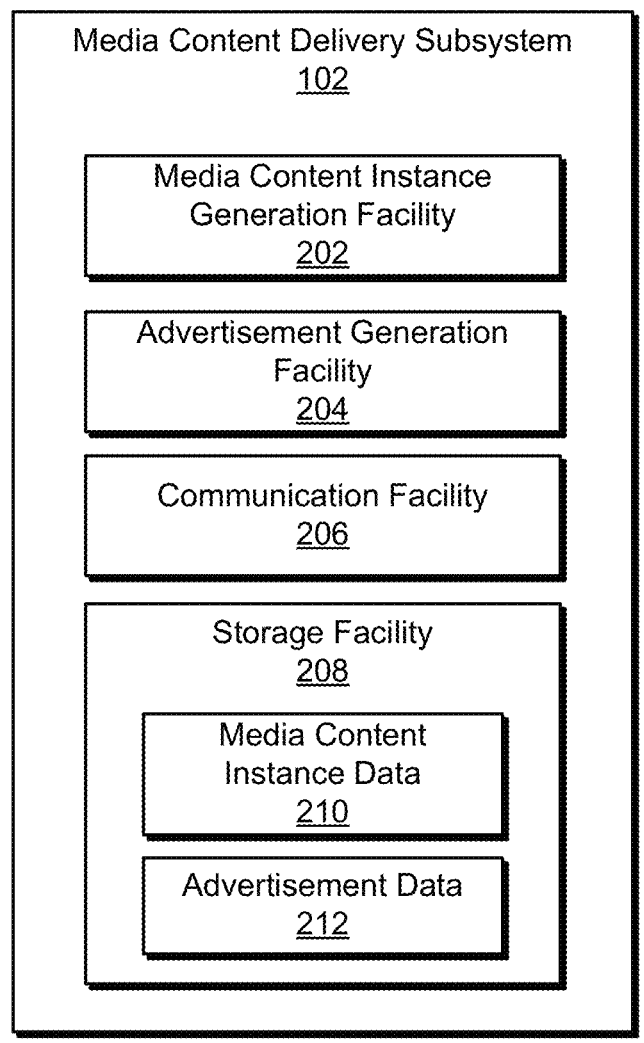
FIG. 2 illustrates exemplary components of a media content delivery subsystem according to principles described herein.

FIG. 2 illustrates exemplary components of delivery subsystem 102. As shown in FIG. 2, delivery subsystem 102 may include a media content instance generation facility 202, an advertisement generation facility 204, a communication facility 206, and a storage facility 208, which may be in communication with one another using any suitable communication technologies. It will be recognized that although facilities 202-208 are shown to be separate facilities in FIG. 2, any of those facilities may be combined into a single facility as may serve a particular application.

Media content instance generation facility 202 may be configured to generate one or more media content instances comprising data representative of one or more media content programs and one or more advertisements. In some examples, the one or more advertisements are interspersed temporally throughout the one or more media content programs. Media content instance generation facility 202 may be configured to generate a media content instance in any suitable manner as may serve a particular application. For example, a media content instance may be generated in accordance with a Moving Pictures Expert Group ("MPEG") format (e.g., "MPEG-2" or "MPEG-4").

Advertisement generation facility 204 may be configured to generate one or more advertisements that may be transmitted to access subsystem 104. In certain embodiments, the one or more advertisements may be targeted specifically for a particular user of access subsystem 104, as will be described in more detail below.

Communication facility 206 may be configured to facilitate communication between delivery subsystem 102 and access subsystem 104. In particular, communication facility 206 may be configured to transmit and/or receive communication signals, media content instances, metadata and/or any other data to/from access subsystem 104. For example, communication facility 206 may transmit (e.g., broadcast, multicast, and/or narrowcast) data representative of one or more media content instances and/or advertisements to access subsystem 104. Such data may be transmitted in one or more media content streams, as one or more data files, or in any other suitable manner as may serve a particular application. Communication facility 206 may be configured to interface with any suitable communication media, protocols, and formats, including any of those mentioned above.

Storage facility 208 may be configured to maintain media content instance data 210 representative of one or more media content instances and advertisement data 212 representative of one or more advertisements. It will be recognized that storage facility 208 may maintain additional or alternative data as may serve a particular implementation.

Figure 3:
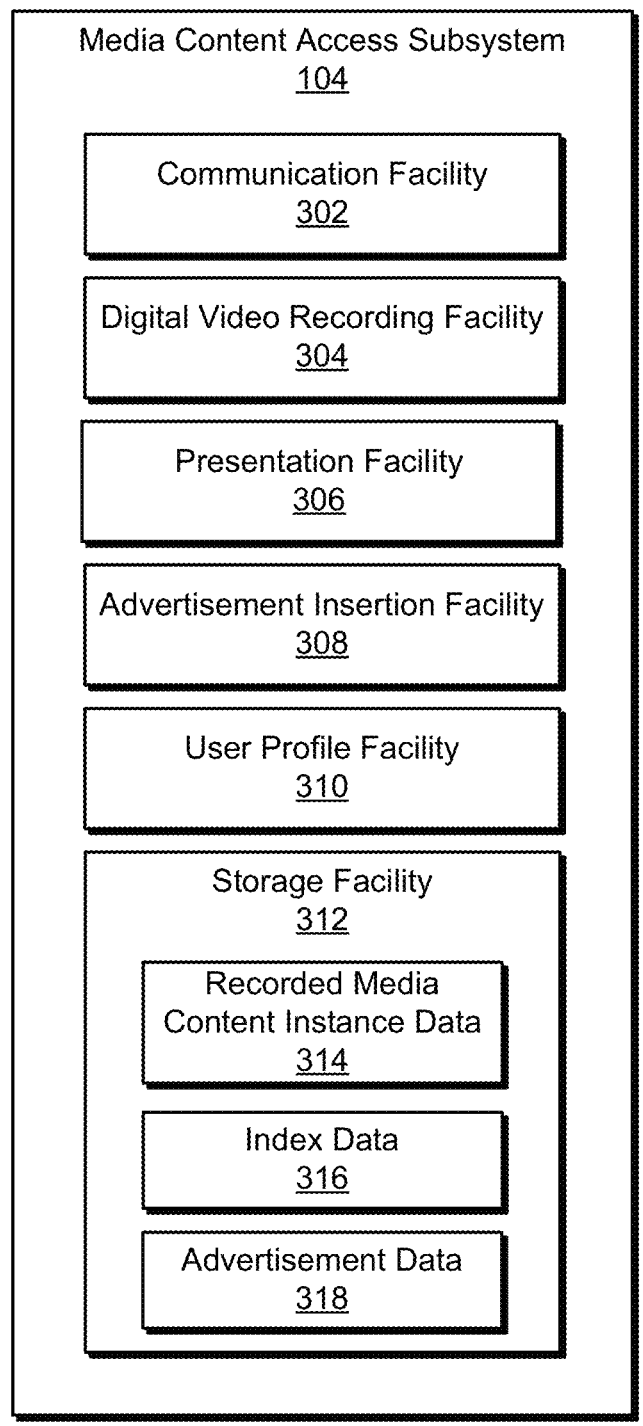
FIG. 3 illustrates exemplary components of a media content access subsystem according to principles described herein.

FIG. 3 illustrates exemplary components of access subsystem 104. As shown in FIG. 3, access subsystem 104 may include a communication facility 302, a digital video recording facility 304, a presentation facility 306, an advertisement insertion facility 308, a user profile facility 310, and a storage facility 312, which may be in communication with one another using any suitable communication technologies. It will be recognized that although facilities 302-312 are shown to be separate facilities in FIG. 3, any of those facilities may be combined into a single facility as may serve a particular application.

Communication facility 302 may be configured to facilitate communication between access subsystem 104 and delivery subsystem 102. In particular, communication facility 302 may be configured to transmit and/or receive communication signals, media content instances, metadata and/or any other data to/from delivery subsystem 102. For example, communication facility 302 may receive data representative of one or more media content instances and/or advertisements from delivery subsystem 102. Communication facility 302 may be configured to interface with any suitable communication media, protocols, and formats, including any of those mentioned above.

Digital video recording facility 304 may be configured to facilitate temporary and/or permanent recording of selected media content instances to storage facility 312. Hence, digital video recording facility 304 enables a user to experience media content in "trick play," or non-linear, modes. For example, digital video recording facility 304 may be configured to receive and execute one or more commands input by a user that are configured to play back a media content instance, pause a presentation of a media content instance, resume a presentation of a media content instance, skip to a different position within a media content instance, fast forward within a media content instance, and/or rewind within a media content instance.

In some examples, digital video recording facility 304 may be configured to maintain data representative of a recorded media content instance and an index file corresponding to the recorded media content instance. The media content instance may be recorded by digital video recording facility 304 (e.g., from a broadcast, multicast, and/or narrowcast media content stream) and/or otherwise obtained (e.g., by way of a file transfer). In some examples, the media content instance may include a media content program (e.g., a television program) and one or more advertisements. In some examples, the one or more advertisements are interspersed temporally throughout the media content instance.

The index file maintained by digital video recording facility 304 may include information corresponding to the recorded media content instance and may be generated (e.g., concurrently) with the recording of the media content instance and/or otherwise acquired (e.g., by way of a file transfer). The information included in the index file may include, but is not limited to, timestamp data representative of a plurality of timestamps each corresponding to a distinct temporal position in the recorded media content instance, storage location data representative of one or more storage locations in storage facility 312 in which data representative of the recorded media content instance is maintained, and/or any other type of data (e.g., metadata) corresponding to the recorded media content instance.

Presentation facility 306 may be configured to control a presentation of the recorded media content instance to a user of access subsystem 104. For example, presentation facility 306 may be configured to play back or otherwise present the recorded media content instance in response to a command input by the user. The playback of the recorded media content instance may be performed linearly (e.g., "normal" playback) and/or non-linearly (e.g., using a trick play mode).

In some examples, presentation facility 306 may be configured to play back the recorded media content instance in accordance with the index file corresponding to the recorded media content instance. For example, presentation facility 306 may utilize the timestamp data and the storage location data included in the index file to determine when each frame or portion of the recorded media content instance is to be presented and where each frame or portion of the recorded media content instance is stored within storage facility 312.

Advertisement insertion facility 308 may be configured to maintain a library of one or more advertisements that may be dynamically presented to the user in place of one or more advertisements originally included in the recorded media content instance. Advertisement insertion facility 308 may be further configured to select a particular advertisement from the advertisement library and direct presentation facility 306 to present the selected advertisement in place of one of the advertisements originally included in the recorded media content instance.

As will be described in more detail below, the selection of the advertisement from the advertisement library and the direction of presentation facility 306 to present the selected advertisement may be performed in real-time during the playback of the recorded media content instance. To this end, as will be described in more detail below, advertisement insertion facility 308 may be configured to dynamically replace, during the playback of the recorded media content instance, a portion of the storage location data in the index file that corresponds to an originally included advertisement with storage location data corresponding to the selected advertisement. The resulting modified index file may be used by presentation facility 306 to present the selected advertisement in place of the originally included advertisement during the playback of the recorded media content instance.

In some examples, advertisement insertion facility 308 may be configured to receive the one or more advertisements included in the advertisement library from delivery subsystem 102 and locally store the one or more advertisements in storage facility 312. Advertisement insertion facility 308 may periodically update the advertisement library with new advertisements received from delivery subsystem 102. Additionally or alternatively, advertisement insertion facility 308 may update the advertisement library with new advertisements in response to one or more pre-determined events (e.g., a detection of a new user of access subsystem 104).

The one or more advertisements included in the advertisement library may be selected to target one or more users of access subsystem 104. For example, access subsystem 104 may include a set-top box device or the like that is used by a family. In this situation, one or more advertisements that target (i.e., are relevant to) the members of the family may be included in the advertisement library. Advertisement insertion facility 308 may be further configured to detect which member of the family is utilizing access subsystem 104 during a particular viewing session (e.g., by way of one or more user profiles maintained by user profile facility 310) and select one or more of the advertisements included in the advertisement library that specifically target that member for presentation during the viewing session.

To facilitate targeted advertising, user profile facility 310 may be configured to maintain a user profile associated with one or more users of access subsystem 104. Each user profile may represent how a particular user interacts with access subsystem 104, one or more personal traits and/or preferences associated with the user, and/or any other information associated with the user as may serve a particular implementation. In some examples, a user profile corresponding to a user may be dynamically updated as various interaction events performed by the user are detected by user profile facility 310.

Storage facility 312 may be configured to maintain recorded media content instance data 314 representative of one or more recorded media content instances, index data 316 representative of one or more index files corresponding to the recorded media content instances, and advertisement data 318 representative of one or more advertisements included in the advertisement library maintained by advertisement insertion facility 308. It will be recognized that storage facility 312 may maintain additional or alternative data as may serve a particular implementation.

Figure 4:
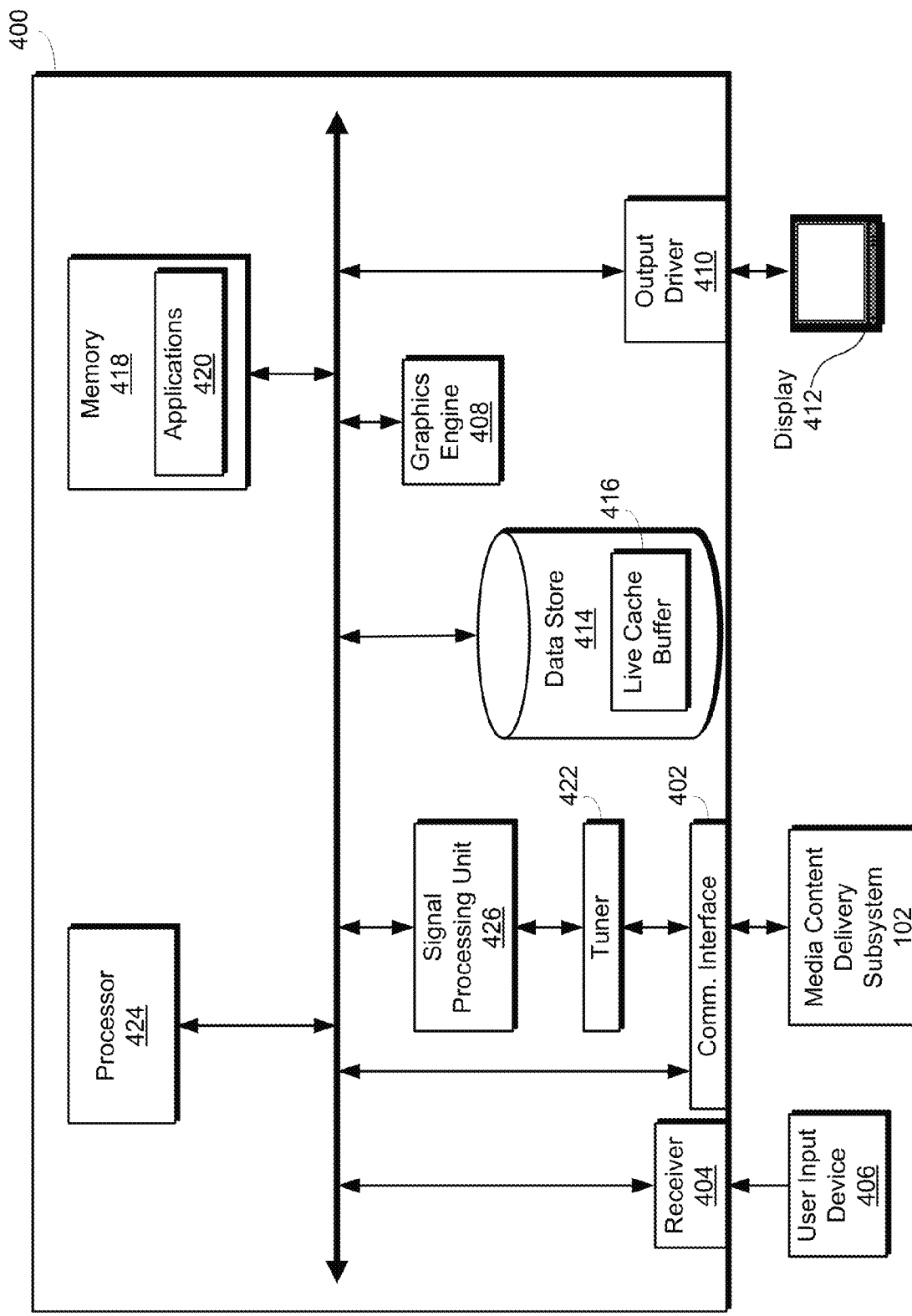
FIG. 4 illustrates an exemplary media content access device having the media content access subsystem of FIG. 3 implemented thereon according to principles described herein.

Access subsystem 104 and/or components of access subsystem 104 may be implemented as may suit a particular application. FIG. 4 illustrates an exemplary media content access device 400 (or simply "device 400") having access subsystem 104 implemented thereon. Device 400 may include one or more of the components of access subsystem 104 shown in FIG. 4 and may be configured to perform one or more of the processes and/or operations described herein. Device 400 may include, but is not limited to, a set-top box device, a digital video recorder ("DVR") device, a multi-room DVR device, a media content processing device, a communications device, a mobile device (e.g., a mobile phone device), a handheld device, a personal computer, a phone device (e.g., Verizon Hub device), a personal-digital assistant device, a gaming device, a television device, and/or any device configured to perform one or more of the processes and/or operations described herein.

As shown in FIG. 4, device 400 may include a communication interface 402 configured to receive media content (e.g., media content) and/or data (e.g., metadata, program guide data, and/or any other data associated with media content) in any acceptable format from provider subsystem 102 or from any other suitable external source. Communication interface 402 may include any device, logic, and/or other technologies suitable for receiving signals and/or data representative of media content and/or other types of media content or data. Communication interface 402 may be configured to interface with any suitable communication media, protocols, and formats, including any of those mentioned above.

Device 400 may include a receiver 404 configured to receive user input signals from a user input device 406. User input device 406 may include, for example, a remote control device or any other suitable input device and may be configured to communicate with receiver 404 via a wireless link, electrical connection, or any other suitable communication link.

Device 400 may include a graphics engine 408 and an output driver 410. Graphics engine 408 may be configured to generate graphics to be provided to output driver 410, which may be configured to interface with or drive a display 412. Output driver 410 may provide output signals to display 412, the output signals including graphical media content (e.g., media content and/or program guide media content) generated by graphics engine 408 and to be presented by display 412 for experiencing by a user. For example, output driver 410 may provide data representative of a GUI including a program guide view or a media playback view to display 412 for presentation to the user. Graphics engine 408 and output driver 410 may include any combination of hardware, software, and/or firmware as may serve a particular application.

Data store 414 may include one or more data storage media, devices, or configurations and may employ any type, form, and combination of storage media. For example, data store 414 may include, but is not limited to, a hard drive, network drive, flash drive, magnetic disc, optical disc, or other non-volatile storage unit. Media content and/or data associated with media content may be temporarily and/or permanently stored in data store 414.

Data store 414 is shown to be included within device 400 in FIG. 4 for illustrative purposes only. It will be understood that data store 414 may additionally or alternatively be located external to device 400.

Data store 414 may include one or more live cache buffers 416. Live cache buffer 416 may additionally or alternatively reside in memory 418 or in a storage device external to device 400. In some examples, media content data may be temporarily stored in live cache buffer 416 to facilitate recording of media content and/or presentation of media content in one or more trick play modes.

Device 400 may include memory 418. Memory 418 may include, but is not limited to, FLASH memory, random access memory ("RAM"), dynamic RAM ("DRAM"), other suitable computer-readable media, or any combination or sub-combination thereof. In some examples, one or more applications 420 configured to run on or otherwise be executed by device 400 may reside in memory 418.

Device 400 may include one or more tuners 422. Tuner 422 may be configured to selectively receive media content carried on a particular media content carrier channel such that the media content may be processed by device 400. In some examples, media content received by tuner 422 may be temporarily buffered, or stored, in the live cache buffer 416. If there are multiple tuners 422, there may be a live cache buffer 416 corresponding to each of the tuners 422.

While tuner 422 may be used to receive certain media content-carrying signals transmitted by provider subsystem 102, device 400 may be configured to receive other types of media content signals (including media content signals and/or program guide data signals) from provider subsystem 102 and/or one or more other sources without using a tuner. For example, provider subsystem 102 may transmit digital streams of data packets (e.g., Internet Protocol ("IP") based data packets) that can be received without using a tuner. For such types of media content signals, communication interface 402 may receive and forward the signals directly to other components of device 400 (e.g., processor 424 or signal processing unit 426) without the signals going through tuner 422. For an IP-based signal, for example, signal processing unit 426 may function as an IP receiver.

Device 400 may include at least one processor, such as processor 424, configured to control and/or perform one or more operations of device 400. Device 400 may also include a signal processing unit 426 configured to process incoming media content. Signal processing unit 426 may be configured, for example, to demodulate and parse encoded digital media content. In some examples, device 400 may include one or more signal processing units 426 corresponding to each of the tuners 422.

Figure 5:
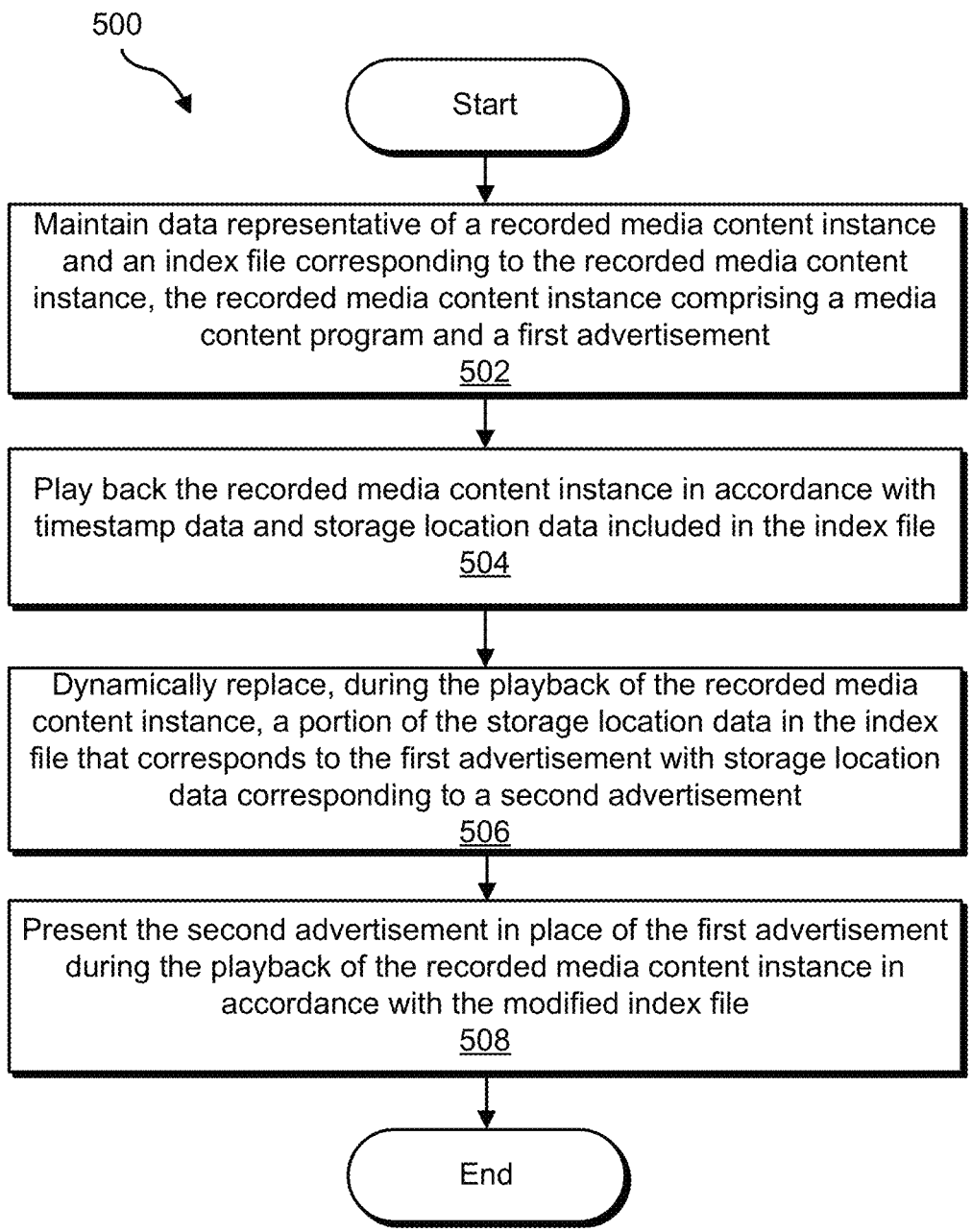
FIG. 5 illustrates an exemplary method of dynamically inserting an advertisement into a recorded media content instance during playback of the recorded media content instance according to principles described herein.

FIG. 5 illustrates an exemplary method 500 of dynamically inserting an advertisement into a recorded media content instance during playback of the recorded media content instance. While FIG. 5 illustrates exemplary steps according to one embodiment, other embodiments may omit, add to, reorder, and/or modify any of the steps shown in FIG. 5. The steps shown in FIG. 5 may be performed by any component or combination of components of access subsystem 104.

In step 502, data representative of a recorded media content instance and an index file corresponding to the recorded media content instance are maintained. The recorded media content instance may include a media content program and a first advertisement, which may be temporally positioned anywhere in the recorded media content instance. The recorded media content instance may additionally include any number of additional advertisements as may serve a particular implementation.

Figure 6:
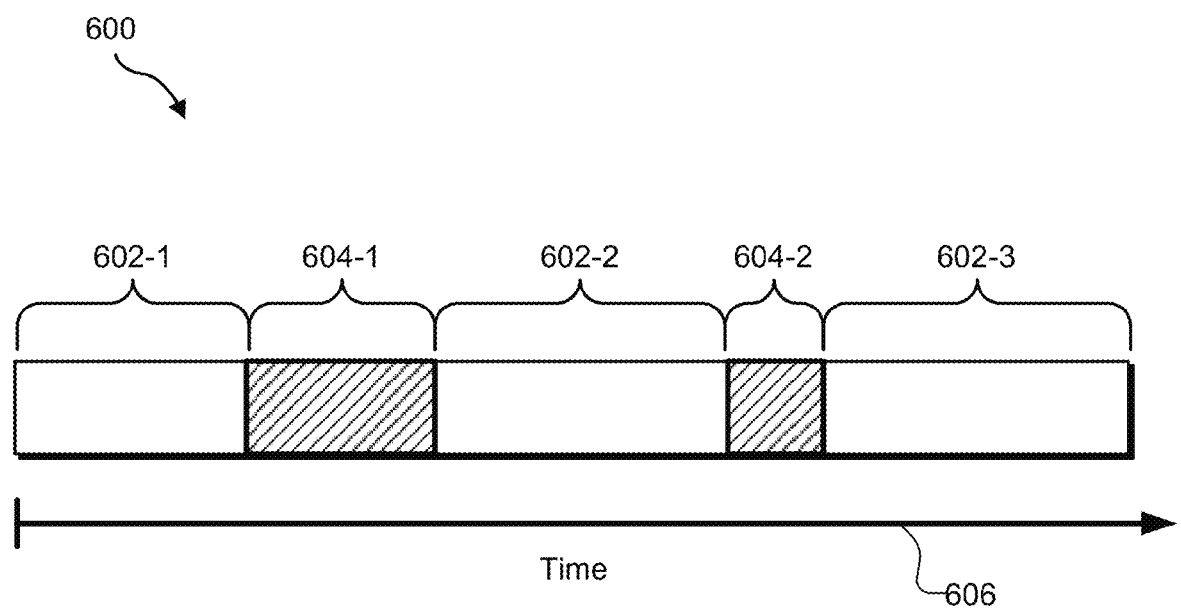
FIG. 6 shows a graphical representation of an exemplary recorded media content instance according to principles described herein.

To illustrate, FIG. 6 shows a graphical representation of an exemplary recorded media content instance 600. As shown in FIG. 6, recorded media content instance 600 may include a media content program represented by program segments 602-1 through 602-3 (collectively "program segments 602") and a plurality of advertisements 604 (e.g., advertisements 604-1 and 604-2). Advertisements 604 may be temporally interspersed throughout recorded media content instance 600 along a time axis 606 as shown in FIG. 6.

Each advertisement 604 may have a distinct set of attributes. For example, each advertisement 604 may be associated with (e.g., "owned by") either a content provider or a content carrier. To illustrate, advertisement 604-2 may be associated with a content provider and may therefore include advertisement content specified by the content provider (e.g., a national advertisement). Advertisement 604-1 may be associated with a content carrier and may therefore include advertisement content specified by the content carrier (e.g., a local advertisement). Advertisements 604 may additionally or alternatively have distinct lengths, content requirements, and/or other attributes as may serve a particular implementation.

In some examples, recorded media content instance 600 may include one or more triggers embedded therein by provider subsystem 102 that are configured to alert access subsystem 104 of an upcoming advertisement 604. Each trigger may precede its corresponding advertisement 604 by a predefined amount of time (e.g., 2 seconds) and may indicate one or more of the attributes of its corresponding advertisement 604 to access subsystem 104.

Figure 7:
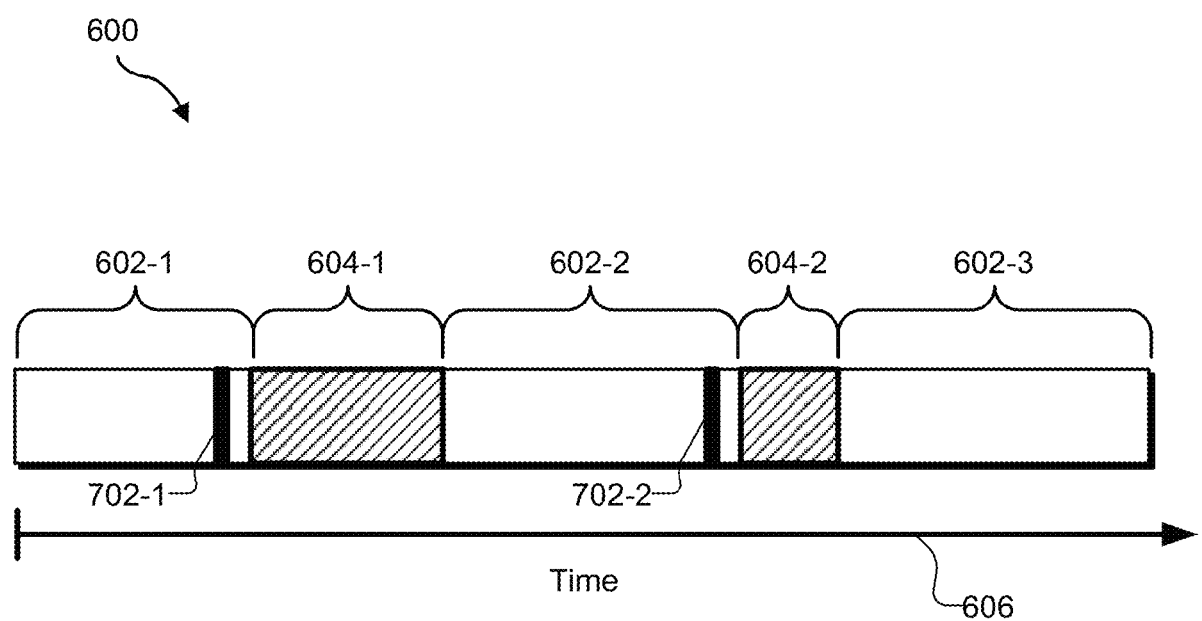
FIG. 7 shows triggers embedded in the recorded media content instance of FIG. 6 according to principles described herein.

To illustrate, FIG. 7 shows triggers 702 (e.g., triggers 702-1 and 702-2) embedded in recorded media content instance 600. Trigger 702-1 precedes and corresponds to advertisement 604-1, and trigger 702-2 precedes and corresponds to advertisement 604-2. Each trigger 702 may include data representative of one or more attributes of its corresponding advertisement 604. For example, trigger 702-1 may include data that indicates start and end times of advertisement 604-1. Trigger 702-1 may additionally include data that indicates that advertisement 604-1 is associated with a content carrier and/or any other data associated with advertisement 604-1 as may serve a particular implementation. Likewise, trigger 702-2 may include data indicative of one or more attributes of advertisement 604-2.

The index file maintained by access subsystem 104 in step 502 of FIG. 5 may include timestamp data and storage location data corresponding to the media content program and advertisements included in recorded media content instance 600. Timestamp data may include data representative of a plurality of timestamps each corresponding to a distinct temporal position in recorded media content instance 600 along time axis 606. Storage location data may include data representative of various storage locations in storage facility 312 in which data representative of the recorded media content instance is maintained. For example, storage location data may include pointers indicative of storage locations of one or more chunks of data stored in storage facility 312 that together comprise the recorded media content instance 600.

In some examples, the index file corresponding to a recorded media content instance (e.g., recorded media content instance 600) may correlate the storage location data with the timestamp data such that access subsystem 104 may properly present recorded media content instance 600 during playback, which may be linear or non-linear. For example, the index file may include one or more pointers identifying a location in storage facility 312 where data representative of advertisement 604-1 is stored and correlate those pointers with timestamps representative of the start and end times of advertisement 604-1.

Figure 8:
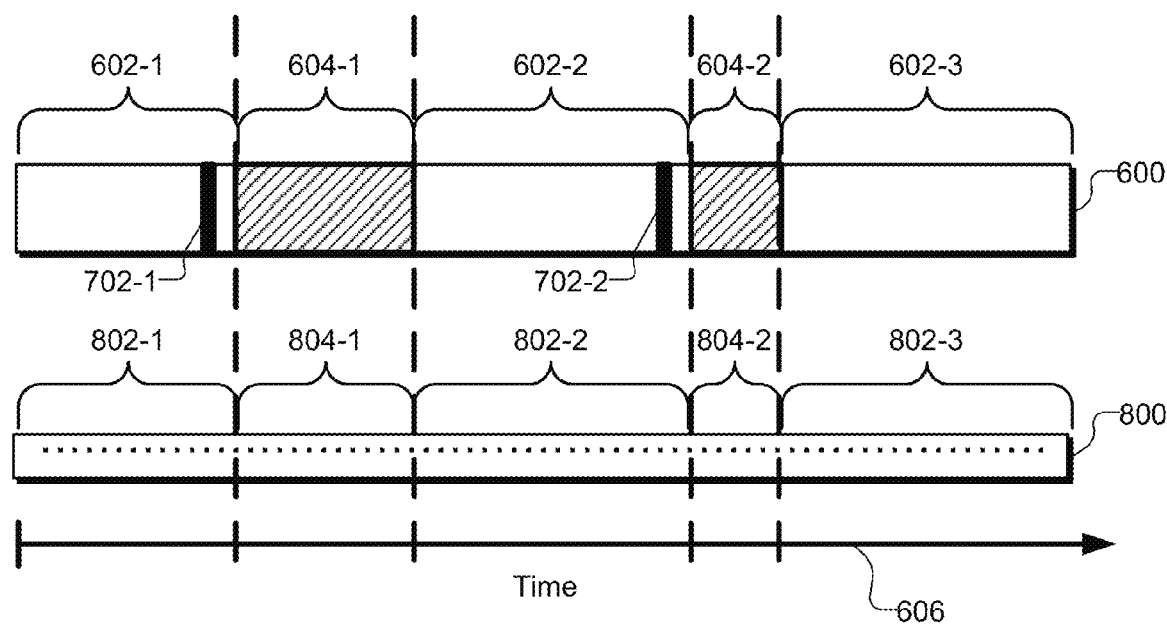
FIG. 8 shows a graphical representation of an exemplary index file that corresponds to the recorded media content instance of FIG. 6 according to principles described herein.

FIG. 8 shows a graphical representation of an exemplary index file 800 that corresponds to recorded media content instance 800. As shown in FIG. 8, index file may include segments 802 (e.g., segments 802-1 through 802-3) that correspond to program segments 602 and segments 804 (e.g., segments 804-1 and 804-2) that correspond to advertisements 604. Each segment 802 and 804 includes timestamp data, storage location data, and/or any other data associated with its corresponding segment 602 or 604 of recorded media content instance 600.

Returning to FIG. 5, in step 504, the recorded media content instance is played back in accordance with the timestamp data and storage location data included the recorded media content instance's corresponding index file. For example, access subsystem 104 may play back recorded media content instance 600 in accordance with the contents of index file 800.

In step 506, a portion of the storage location data in the index file that corresponds to the first advertisement (e.g., advertisement 604-1) is dynamically replaced during the playback of the recorded media content instance with storage location data corresponding to a second advertisement. The second advertisement may be selected from an advertisement library maintained by advertisement insertion facility 308, for example, and, in certain embodiments, may be configured to target a particular user of access subsystem 104.

Figure 9:
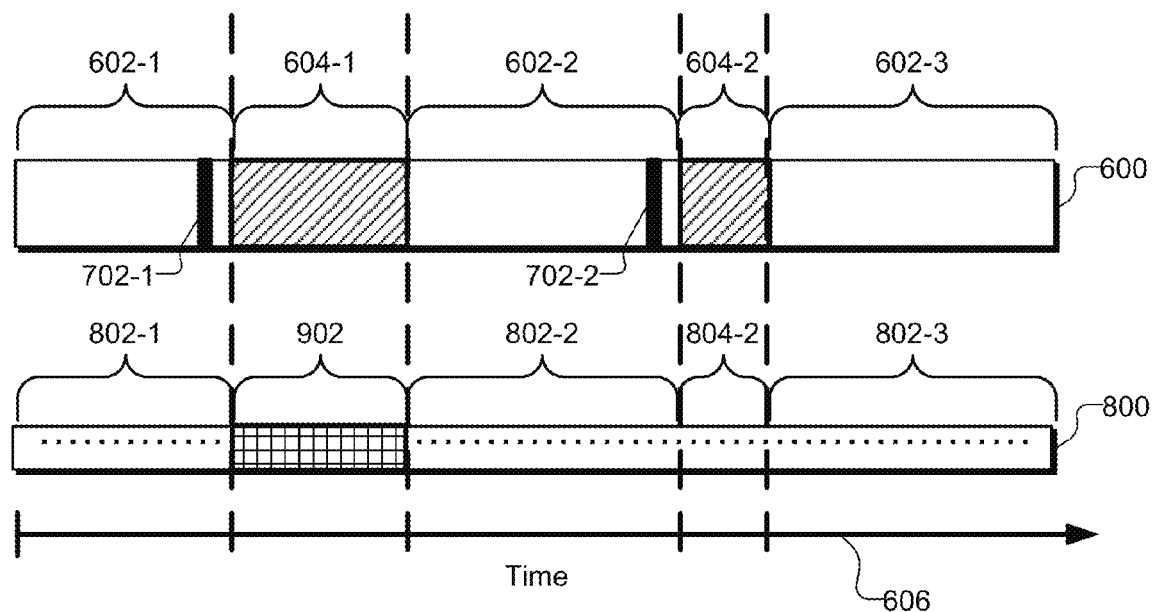
FIG. 9 shows that a segment in the index file of FIG. 8 has been replaced with a new segment according to principles described herein.

The dynamic replacement of the portion of the storage location data in the index file that corresponds to the first advertisement may be performed in accordance with any suitable replacement heuristic. For example, advertisement insertion facility 308 may replace a portion of the storage location data in index file 800 that corresponds to advertisement 604-1 included in recorded media content instance 600 by first detecting trigger 702-1. As mentioned, trigger 702-1 may indicate a start and end time of advertisement 604-1. Advertisement insertion facility 308 may then analyze index file 800 to identify a first timestamp that corresponds to the indicated start time and a second timestamp that corresponds to the indicated end time. Advertisement insertion facility 308 may then identify a segment of storage location data included in index file 800 that corresponds to the time period defined by the first and second timestamps and replace the identified segment of storage location data with storage location data corresponding to the second advertisement. It will be recognized that an advertisement having a length substantially equal to the length of the first advertisement may be selected as the second advertisement. To illustrate, FIG. 9 shows that segment 804-1 in index file 800 has been replaced with a new segment 902, which may include storage location data corresponding to the second advertisement. It will be recognized that advertisement insertion facility 308 may additionally replace any other data in index file 800 with data associated with the second advertisement as may serve a particular implementation.

Returning to FIG. 5, the dynamic replacement of storage location data performed in step 506 results in a real-time modification of the index file corresponding to the recorded media content instance. In step 508, the second advertisement is presented in place of the first advertisement during the playback of the recorded media content instance in accordance with the modified index file. For example, presentation facility 306 may present an advertisement stored at a location indicated by storage location data included in new segment 902 during a time period defined by the start and end times of advertisement 604-1.

In some examples, steps 506 and 508 may be repeated for subsequent playbacks of the recorded media content instance. In this manner, new advertisements may be presented to the user each time the user views the recorded media content instance. One or more components of access subsystem 104 (e.g., advertisement insertion facility 308) may be configured to track a number of times that each advertisement is presented to a user. The tracking information may be used by access subsystem 104 and/or provider subsystem 102 to generate and/or select new advertisements for presentation to the user.

Figure 10:
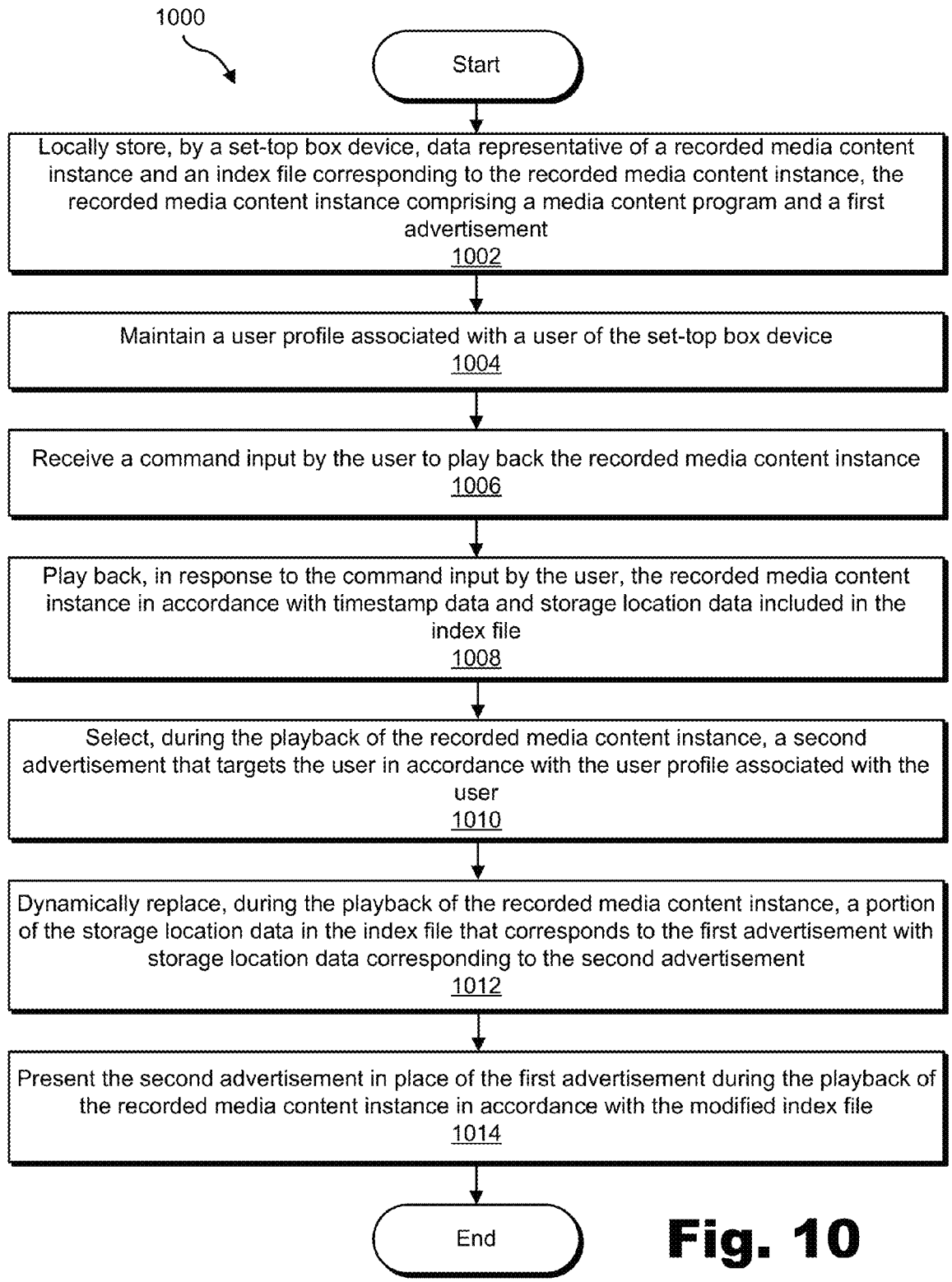
FIG. 10 illustrates another exemplary method of dynamically inserting an advertisement into a recorded media content instance during playback of the recorded media content instance according to principles described herein.

FIG. 10 illustrates another exemplary method 1000 of dynamically inserting an advertisement into a recorded media content instance during playback of the recorded media content instance. While FIG. 10 illustrates exemplary steps according to one embodiment, other embodiments may omit, add to, reorder, and/or modify any of the steps shown in FIG. 10. The steps shown in FIG. 10 may be performed by any component or combination of components of access subsystem 104.

In step 1002, a set-top box device locally stores data representative of a recorded media content instance and an index file corresponding to the recorded media content instance. The recorded media content instance may include a media content program and a first advertisement. The set-top box device may locally store the data in any suitable location (e.g., data store 414).

In step 1004, a user profile associated with a user of the set-top box device is maintained. The user profile may represent how the user interacts with the set-top box device, one or more personal traits and/or preferences associated with the user, and/or any other information associated with the user as may serve a particular implementation.

In step 1006, the set-top box device receives a command input by the user to play back the recorded media content instance. The command may be received in any suitable way as may serve a particular implementation.

In step 1008, the recorded media content instance is played back in response to the command input by the user and in accordance with timestamp data and storage location data included in the index file. The recorded media content instance may be played back in any of the ways described herein.

In step 1010, a second advertisement that targets the user in accordance with the user profile associated with the user is selected during the playback of the recorded media content instance. The second advertisement may be selected in any of the ways described herein.

In step 1012, a portion of the storage location data in the index file that corresponds to the first advertisement is dynamically replaced with storage location data corresponding to the second advertisement during the playback of the recorded media content instance. The dynamic replacement may be performed in any of the ways described herein.

In step 1014, the second advertisement is presented in place of the first advertisement during the playback of the recorded media content instance in accordance with the index file after it has been modified in step 1012. The second advertisement may be presented in any of the ways described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software), or combinations of computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 11:
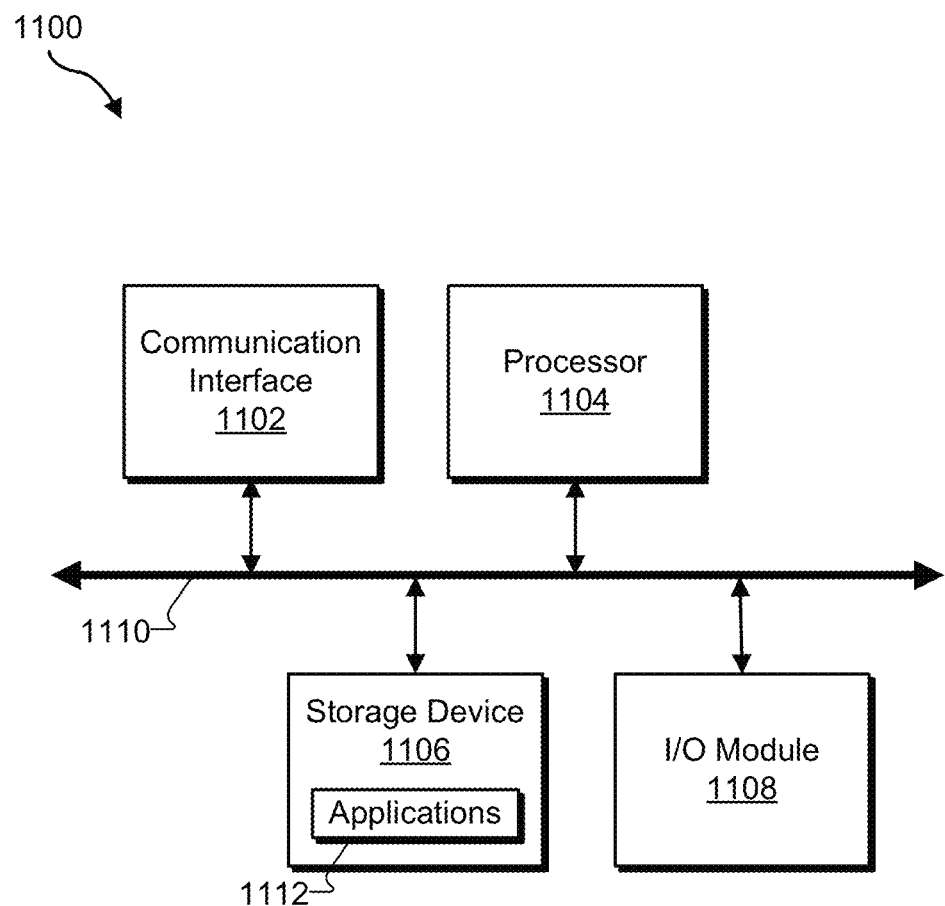
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, and any other suitable interface. In at least one embodiment, communication interface 1102 may provide a direct connection between system 100 and one or more of provisioning systems 202 via a direct link to a network, such as the Internet. Communication interface 1102 may additionally or alternatively provide such a connection through, for example, a local area network (such as an Ethernet network), a personal area network, a telephone or cable network, a satellite data connection, a dedicated URL, or any other suitable connection. Communication interface 1102 may be configured to interface with any suitable communication media, protocols, and formats, including any of those mentioned above.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof.

Electronic data, including data described herein, may be temporarily and/or permanently stored in storage device 1106. For example, data representative of one or more executable applications 1112 (which may include, but are not limited to, one or more of the software applications described herein) configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with communication facility 202, media content instance generation facility 204, advertisement generation facility 206, communication facility 302, digital video recording facility 304, presentation facility 306, and/or advertisement insertion facility 308. Likewise, storage facility 208 and/or storage facility 312 may be implemented by or within storage device 1106.

It will be recognized that any other technique for dynamically inserting an advertisement into a playback of a recorded media content instance may be used in accordance with the methods and systems herein. For example, instead of dynamically modifying an index file corresponding to a recorded media content instance during playback of the media content instance, the index file may be modified before the playback of the media content instance begins (i.e., during an offline procedure). In this manner, when the user plays back the recorded media content instance, new advertisements will have already been inserted for presentation to the user.

Additionally or alternatively, the actual recorded media content instance (in addition to or instead of the index file corresponding to the recorded media content instance) may be modified to include new advertisement content. The modification of the recorded media content instance may be performed before and/or during playback of the recorded media content instance.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   maintaining, by a media content access subsystem, data representative of a recorded media content instance and an index file corresponding to the recorded media content instance, the recorded media content instance comprising a media content program and a first advertisement, the index file comprising timestamp data and storage location data corresponding to the media content program and to the first advertisement;
   playing back, by the media content access subsystem and in response to a command input by a user to play back the recorded media content instance, the recorded media content instance in accordance with the timestamp data and the storage location data included in the index file;
   dynamically replacing in real-time, by the media content access subsystem during the playback of the recorded media content instance, a portion of the storage location data in the index file that corresponds to the first advertisement with storage location data corresponding to a second advertisement, the dynamic replacing resulting in a modified index file, wherein the dynamically replacing further comprises:
      detecting an advertisement trigger that indicates a start time and an end time of the first advertisement,
      identifying, in response to the detected trigger, a length of the first advertisement, and
      selecting, during the playback of the recorded media content instance, the second advertisement based on a user profile associated with the user and the identified length of the first advertisement; and
   presenting, by the media content access subsystem, the second advertisement in place of the first advertisement during the playback of the recorded media content instance in accordance with the modified index file.

2. The method of claim 1, wherein the timestamp data comprises data representative of a plurality of timestamps each corresponding to a distinct temporal position in the recorded media content instance, and wherein the dynamic replacing comprises
   detecting a trigger in the recorded media content instance that indicates a start time of the first advertisement and an end time of the first advertisement,
   identifying a first timestamp included in the plurality of timestamps that corresponds to the start time and a second timestamp included in the plurality of timestamps that corresponds to the end time, and
   replacing a segment of the storage location data in the index file that corresponds to a time period defined by the first and second timestamps with the storage location data corresponding to the second advertisement.

3. The method of claim 1, further comprising locally storing, by the media content access subsystem, data representative the second advertisement.

4. The method of claim 1, wherein the second advertisement is configured to target a particular user of the media content access subsystem.

5. The method of claim 1, further comprising:
   maintaining, by the media content access subsystem, data representative of a plurality of advertisements configured to target a user of the media content access subsystem; and selecting, by the media content access subsystem, one of the plurality of advertisements as the second advertisement based on a user profile associated with the user.

6. The method of claim 5, wherein the maintaining of the data representative of the plurality of advertisements comprises periodically updating the plurality of advertisements with new advertisements configured to target the user of the media content access subsystem.

7. The method of claim 1, further comprising:
playing back a second time, by the media content access subsystem, the recorded media content instance in accordance with the timestamp data and the storage location data included in the index file; and
dynamically replacing, by the media content access subsystem during the second playback of the recorded media content instance, the portion of the storage location data in the index file that corresponds to the second advertisement with storage location data corresponding to a third advertisement, the dynamic replacing resulting in another modified index file; and
presenting, by the media content access subsystem, the third advertisement in place of the second advertisement during the second playback of the recorded media content instance in accordance with the another modified index file.

8. The method of claim 1, wherein the playback of the recorded media content instance is performed using a trick play mode.

9. The method of claim 1, further comprising tracking, by the media content processing subsystem, a number of times that the second advertisement is presented to a user.

10. The method of claim 1, wherein the first advertisement is temporally surrounded by portions of the media content program.

11. The method of claim 1, embodied as computer-executable instructions on at least one tangible computer-readable medium.

12. The method of claim 1, wherein the advertisement trigger includes data representative of one or more attributes of the first advertisement.

13. A method comprising:
locally storing, by a set-top box device, data representative of a recorded media content instance and an index file corresponding to the recorded media content instance, the recorded media content instance comprising a media content program and a first advertisement, the index file comprising timestamp data and storage location data corresponding to the media content program and to the first advertisement;
maintaining, by the set-top box device, a user profile associated with a user of the set-top box device;
receiving, by the set-top box device, a command input by the user to play back the recorded media content instance;
playing back, by the set-top box device in response to the command input by the user, the recorded media content instance in accordance with the timestamp data and the storage location data included in the index file;
detecting, by the set-top box device, an advertisement trigger that indicates a start time and an end time of the first advertisement;
identifying, by the set-top box device and in response to the detected trigger, a length of the first advertisement;
selecting, by the set-top box device during the playback of the recorded media content instance, a second advertisement based on the user profile associated with the user and the identified length of the first advertisement;

dynamically replacing in real-time, by the set-top box device during the playback of the recorded media content instance, a portion of the storage location data in the index file that corresponds to the first advertisement with storage location data corresponding to the second advertisement, the dynamic replacing resulting in a modified index file; and
presenting, by the set-top box device, the second advertisement in place of the first advertisement during the playback of the recorded media content instance in accordance with the modified index file.

14. The method of claim 13, wherein the timestamp data comprises data representative of a plurality of timestamps each corresponding to a distinct temporal position in the recorded media content instance, and wherein the dynamic replacing comprises
detecting a trigger in the recorded media content instance that indicates a start time of the first advertisement and an end time of the first advertisement,
identifying a first timestamp included in the plurality of timestamps that corresponds to the start time and a second timestamp included in the plurality of timestamps that corresponds to the end time, and
replacing a segment of the storage location data in the index file that corresponds to a time period defined by the first and second timestamps with the storage location data corresponding to the second advertisement.

15. The method of claim 13, further comprising:
maintaining, by the set-top box device, data representative of a plurality of advertisements configured to target the user of the set-top box device; and
selecting, by the set-top box device, one of the plurality of advertisements as the second advertisement based on the user profile associated with the user.

16. The method of claim 15, wherein the maintaining of the data representative of the plurality of advertisements comprises periodically updating the plurality of advertisements with new advertisements configured to target the user of the set-top box device.

17. The method of claim 15, embodied as computer-executable instructions on at least one tangible computer-readable medium.

18. A method comprising:
maintaining, by a media content access subsystem, data representative of a recorded media content instance and an index file corresponding to the recorded media content instance, the recorded media content instance comprising a media content program and a first advertisement, the index file comprising timestamp data and storage location data corresponding to the media content program and to the first advertisement;
replacing in real-time, by the media content access subsystem and during the playback of the recorded media content instance, a portion of the storage location data in the index file that corresponds to the first advertisement with storage location data corresponding to a second advertisement, the replacing resulting in a modified index file, wherein the replacing further comprises:
detecting an advertisement trigger that indicates a start time and an end time of the first advertisement,
identifying, in response to the detected trigger, a length of the first advertisement, and
selecting, during the playback of the recorded media content instance, the second advertisement based on a user profile associated with a user and the identified length of the first advertisement; and playing back, by the media content access subsystem and in response to a command input by the user to play back the recorded media content instance, the recorded media content instance in accordance with the timestamp data and the storage location data included in the modified index file.

19. A system comprising:
a digital video recording facility configured to maintain data representative of a recorded media content instance and an index file corresponding to the recorded media content instance, the recorded media content instance comprising a media content program and a first advertisement, the index file comprising timestamp data and storage location data corresponding to the media content program and to the first advertisement;
a presentation facility communicatively coupled to the digital video recording facility and configured to play back, in response to a command input by a user to play back the recorded media content instance, the recorded media content instance in accordance with the timestamp data and the storage location data included in the index file; and
an advertisement insertion facility configured to dynamically replace, in real-time and during the playback of the recorded media content instance, a portion of the storage location data in the index file that corresponds to the first advertisement with storage location data corresponding to a second advertisement, the dynamic replacement resulting in a modified index file, wherein the dynamically replacing further comprises:
 detecting an advertisement trigger that indicates a start time and an end time of the first advertisement,
 identifying, in response to the detected trigger, a length of the first advertisement, and
 selecting, during the playback of the recorded media content instance, the second advertisement based on a user profile associated with the user and the identified length of the first advertisement;
wherein the presentation facility is further configured to present the second advertisement in place of the first advertisement during the playback of the recorded media content instance in accordance with the modified index file.

20. The system of claim 19, wherein the timestamp data comprises data representative of a plurality of timestamps each corresponding to a distinct temporal position in the recorded media content instance, and wherein the advertisement insertion facility is configured to dynamically replace the portion of the storage location data in the index file that corresponds to the first advertisement with the storage location data corresponding to the second advertisement by
 detecting a trigger in the recorded media content instance that indicates a start time of the first advertisement and an end time of the first advertisement,
 identifying a first timestamp included in the plurality of timestamps that corresponds to the start time and a second timestamp included in the plurality of timestamps that corresponds to the end time, and
 replacing a segment of the storage location data in the index file that corresponds to a time period defined by the first and second timestamps with the storage location data corresponding to the second advertisement.

21. The system of claim 19, wherein the second advertisement is configured to target a particular user of the media content access subsystem.

22. The system of claim 19, wherein the advertisement insertion facility is further configured to:
 maintain data representative of a plurality of advertisements configured to target a user of the media content access subsystem; and
 select one of the plurality of advertisements as the second advertisement based on an user profile associated with the user.

* * * * *